US 9,292,053 B2

(12) United States Patent
Imana et al.

(10) Patent No.: US 9,292,053 B2
(45) Date of Patent: Mar. 22, 2016

(54) METHOD AND SYSTEM FOR CONTACT SEPARATION DETECTION GESTURE (71) Applicant: Kobo Inc., Toronto (CA)

(72) Inventors: Juan Ernesto Salas Imana, Toronto (CA); Damian Lewis, Toronto (CA)

(73) Assignee: Kobo Inc., Toronto (CA)

( * ) Notice: Subject to any disclaimer, the term of this patent is extended or adjusted under 35 U.S.C. 154(b) by 0 days.

(21) Appl. No.: 14/302,902

(22) Filed: Jun. 12, 2014

(65) Prior Publication Data

US 2015/0362961 A1  Dec. 17, 2015

(51) Int. Cl.
*G06F 1/16* (2006.01)
*G06F 3/01* (2006.01)

(52) U.S. Cl.
CPC .............. *G06F 1/1694* (2013.01); *G06F 1/1656* (2013.01); *G06F 3/017* (2013.01); *G06F 2200/1636* (2013.01); *G06F 2203/0382* (2013.01)

(58) Field of Classification Search
CPC ........... G09G 5/00; G09G 5/003; G09G 5/32; G09G 5/34; G09G 5/373; G09G 5/391; G09G 2340/045; G09G 2380/02; G09G 2380/14; G09G 2380/04
See application file for complete search history.

(56) References Cited

U.S. PATENT DOCUMENTS

2006/0274036 A1* 12/2006 Hioki et al. .................... 345/156
2012/0311438 A1* 12/2012 Cranfill et al. ................. 715/256

* cited by examiner

*Primary Examiner* — Kristy A Haupt
(74) *Attorney, Agent, or Firm* — Oblon, McClelland, Maier & Neustadt, L.L.P.

(57) ABSTRACT

A computing device includes a housing and a display assembly having a screen. The housing at least partially circumvents the screen so that the screen is viewable. A first touch sensor is provided with a first portion of the housing. For example, the first touch sensor may be provided on a sidewall, a front surface, or a back surface of the housing. A processor is provided within the housing to detect a first user interaction and a second user interaction with the first touch sensor. The first user interaction corresponds with a user making contact with the first touch sensor, and the second user interaction corresponds with the user releasing contact with the first touch sensor. The processor further executes a first set of instructions in response to detecting the second user interaction.

20 Claims, 6 Drawing Sheets

METHOD AND SYSTEM FOR CONTACT SEPARATION DETECTION GESTURE

TECHNICAL FIELD

Examples described herein relate to a computing device that is responsive to contact-separation inputs detected via a touch-sensitive housing.

BACKGROUND

An electronic personal display is a mobile electronic device that displays information to a user. While an electronic personal display is generally capable of many of the functions of a personal computer, a user can typically interact directly with an electronic personal display without the use of a keyboard that is separate from or coupled to but distinct from the electronic personal display itself. Some examples of electronic personal displays include mobile digital devices/tablet computers such (e.g., Apple iPad®, Microsoft® Surface™, Samsung Galaxy Tab® and the like), handheld multimedia smartphones (e.g., Apple iPhone®, Samsung Galaxy S®, and the like), and handheld electronic readers (e.g., Amazon Kindle®, Barnes and Noble Nook®, Kobo Aura HD, and the like).

An electronic reader, also known as an e-reader device, is an electronic personal display that is used for reading electronic books (eBooks), electronic magazines, and other digital content. For example, digital content of an e-book is displayed as alphanumeric characters and/or graphic images on a display of an e-reader such that a user may read the digital content much in the same way as reading the analog content of a printed page in a paper-based book. An e-reader device provides a convenient format to store, transport, and view a large collection of digital content that would otherwise potentially take up a large volume of space in traditional paper format.

In some instances, e-reader devices are purpose-built devices designed to perform especially well at displaying readable content. For example, a purpose built e-reader device includes a display that reduces glare, performs well in highly lit conditions, and/or mimics the look of text on actual paper. While such purpose built e-reader devices excel at displaying content for a user to read, they can also perform other functions, such as displaying images, emitting audio, recording audio, and web surfing, among others.

There also exist numerous kinds of consumer devices that can receive services and resources from a network service. Such devices can operate applications or provide other functionality that links the device to a particular account of a specific service. For example, e-reader devices typically link to an online bookstore, and media playback devices often include applications which enable the user to access an online media library. In this context, the user accounts can enable the user to receive the full benefit and functionality of the device.

DETAILED DESCRIPTION

Embodiments described herein provide for a computing device that interprets a specific kind of user action as input in the context of displaying paginated content such as an e-book. More specifically, the input may be provided by a user releasing contact with a touch-sensitive region of the computing device. For example, the user may establish an initial contact with the touch-sensitive region when holding the device in one or both hands. The user may subsequently effect a page turn and/or other operations on the computing device by lifting one or more fingers off of the touch-sensitive region.

According to some embodiments, a computing device includes a housing and a display assembly having a screen. The housing at least partially circumvents the screen so that the screen is viewable. A first touch sensor is provided with a portion of the housing. For example, the first touch sensor may be provided on a sidewall, a front surface, or a back surface of the housing. A processor is provided within the housing to detect a first user interaction and a second user interaction with the first touch sensor. The first user interaction corresponds with a user making contact with the first touch sensor and the second user interaction corresponds with the user releasing contact with the first touch sensor. The processor further executes a first set of instructions in response to detecting the second user interaction.

The first set of instructions executed by the processor may cause a change in state of the display screen. For example, the first instructions may include: instructions for powering on or powering of the display; instructions for launching or closing an application; instructions for invoking or closing a system menu; and/or instructions for performing a page turn.

For some embodiments, a second touch sensor may be provided with a second portion of the housing. For example, the processor may detect a third user interaction and a fourth user interaction with the second touch sensor. The third user interaction corresponds with the user making contact with the second touch sensor and the fourth user interaction corresponds with the user releasing contact with the second touch sensor. The processor may further execute a second set of instructions in response to detecting the fourth user interaction. For example, the processor may perform a forward page transition in response to detecting the second user interaction, and may perform a backward page transition in response to detecting the fourth user interaction.

Among other benefits, examples described herein enable a personal display device such as an e-reader device to receive contact-separation inputs via a touch-sensitive housing. More specifically, a user typically holds an e-reader device with one or two hands, such that a number of the user's fingers are in constant contact with (e.g., gripping) the device housing. Detecting user inputs based on the user releasing contact with (e.g., lifting a finger off) the housing allows e-reader operations (such as page turns) to be initiated in a more efficient and/or ergonomic manner.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, embodiments may be implemented in the form of computer programs, or a computer usable carrier medium capable of carrying such a program.

System Description

Figure 1:
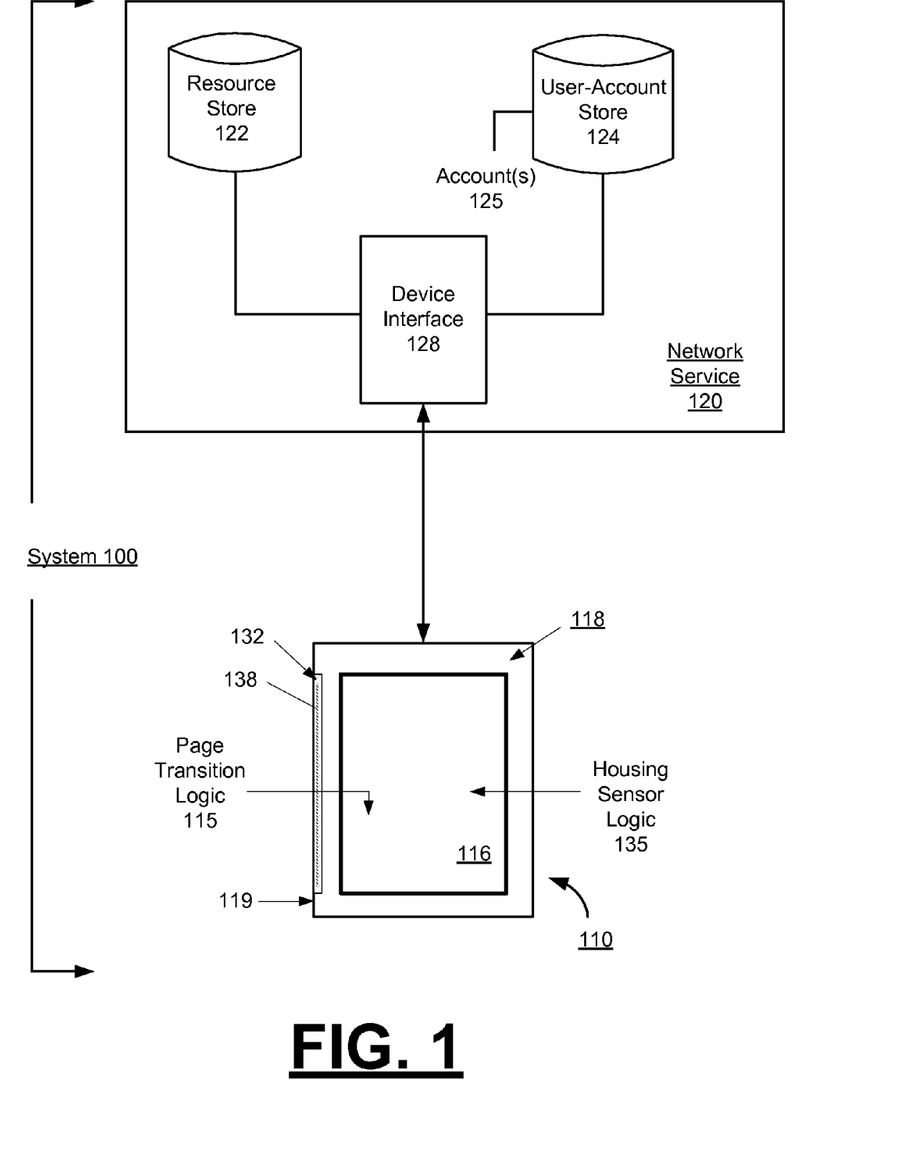
FIG. 1 illustrates a system for utilizing applications and providing e-book services on a computing device, according to an embodiment.

FIG. 1 illustrates a system 100 for utilizing applications and providing e-book services on a computing device, according to an embodiment. In an example of FIG. 1, system 100 includes an electronic display device, shown by way of example as an e-reader device 110, and a network service 120. The network service 120 can include multiple servers and other computing resources that provide various services in connection with one or more applications that are installed on the e-reader device 110. By way of example, in one implementation, the network service 120 can provide e-book services which communicate with the e-reader device 110. The e-book services provided through network service 120 can, for example, include services in which e-books are sold, shared, downloaded and/or stored. More generally, the network service 120 can provide various other content services, including content rendering services (e.g., streaming media) or other network-application environments or services.

The e-reader device 110 can correspond to any electronic personal display device on which applications and application resources (e.g., e-books, media files, documents) can be rendered and consumed. For example, the e-reader device 110 can correspond to a tablet or a telephony/messaging device (e.g., smart phone). In one implementation, for example, e-reader device 110 can run an e-reader application that links the device to the network service 120 and enables e-books provided through the service to be viewed and consumed. In another implementation, the e-reader device 110 can run a media playback or streaming application that receives files or streaming data from the network service 120. By way of example, the e-reader device 110 can be equipped with hardware and software to optimize certain application activities, such as reading electronic content (e.g., e-books). For example, the e-reader device 110 can have a tablet-like form factor, although variations are possible. In some cases, the e-reader device 110 can also have an E-ink display.

In additional detail, the network service 120 can include a device interface 128, a resource store 122 and a user account store 124. The user account store 124 can associate the e-reader device 110 with a user and with an account 125. The account 125 can also be associated with one or more application resources (e.g., e-books), which can be stored in the resource store 122. As described further, the user account store 124 can retain metadata for individual accounts 125 to identify resources that have been purchased or made available for consumption for a given account. The e-reader device 110 may be associated with the user account 125, and multiple devices may be associated with the same account. As described in greater detail below, the e-reader device 110 can store resources (e.g., e-books) that are purchased or otherwise made available to the user of the e-reader device 110, as well as to archive e-books and other digital content items that have been purchased for the user account 125, but are not stored on the particular computing device.

With reference to an example of FIG. 1, e-reader device 110 can include a display screen 116 and a housing 118. In an embodiment, the display screen 116 is touch-sensitive, to process touch inputs including gestures (e.g., swipes). Additionally, the housing 118 may be integrated with one or more touch sensors 138 to provide a touch sensing region 132 on a surface of the housing 118. For some embodiments, the one or more touch sensors 138 may include capacitive sensors that can sense or detect a human body's capacitance as input. In the example of FIG. 1, the touch sensing region 132 is provided on a sidewall 119 of the housing 118. In a particular implementation, the touch sensing region 132 can correspond to a strip of the housing 118 that occupies a portion of an overall length of the housing sidewall 119.

According to some embodiments, the e-reader device 100 includes housing sensor logic 135 to detect and interpret user input made through interaction with the housing touch sensors 138. By way of example, the housing sensor logic 135 can detect a user making contact with, and subsequently releasing, the touch sensing region 132. For some embodiments, the housing sensor logic 135 may interpret the release of contact (e.g., contact separation) with the touch sensing region 132 as a particular type of user input. Specifically, the user input may be interpreted as a change in state of the display 116. For example, a user may release the sensing region 132 to power on and/or power off the display 116. Alternatively, or in addition, the user may release the sensing region 132 to invoke and/or close a system menu or submenu. Still further, the user may launch and/or close applications by letting go of the touch sensing region 132. In the context of an e-book application, the user can release the touch sensing region 132 to, for example, mark a page or a passage.

In some embodiments, the e-reader device 110 includes features for providing and enhancing functionality related to displaying paginated content. The e-reader device can include page transitioning logic 115, which enables the user to transition through paginated content. The e-reader device can display pages from e-books, and enable the user to transition from one page state to another. In particular, an e-book can provide content that is rendered sequentially in pages, and the e-book can display page states in the form of single pages, multiple pages or portions thereof. Accordingly, a given page state can coincide with, for example, a single page, or two or more pages displayed at once. The page transitioning logic 115 can operate to enable the user to transition from a given page state to another page state. In some implementations, the page transitioning logic 115 enables single page transitions, chapter transitions, or cluster transitions (multiple pages at one time).

The page transitioning logic 115 can be responsive to various kinds of interfaces and actions in order to enable page transitioning. In one implementation, the user can signal a page transition event to transition page states by, for example, interacting with the touch sensing region 132. For example, the user can release a particular portion of the touch sensing region 132 (e.g., by lifting a finger gripping the top half of the sensing region 132 or lifting a finger gripping the bottom half of the sensing region 132) to indicate a sequential direction of a page transition. In variations, the user can specify different kinds of page transitioning input (e.g., single page turns, multiple page turns, chapter turns) through different kinds of input. Additionally, the page turn input of the user can be provided with a magnitude to indicate a magnitude (e.g., number of pages) in the transition of the page state. For example, a user may hold a finger off the touch sensing region 132 for a duration of time in order to cause a cluster or chapter page state transition, while a brief release (and return to contact) with the same region can effect a single page state transition (e.g., from one page to a next in sequence). In another example, a user can specify page turns of different kinds or magnitudes through single releases, sequenced releases or patterned releases of the touch sensing region 132.

Hardware Description

Figure 2:
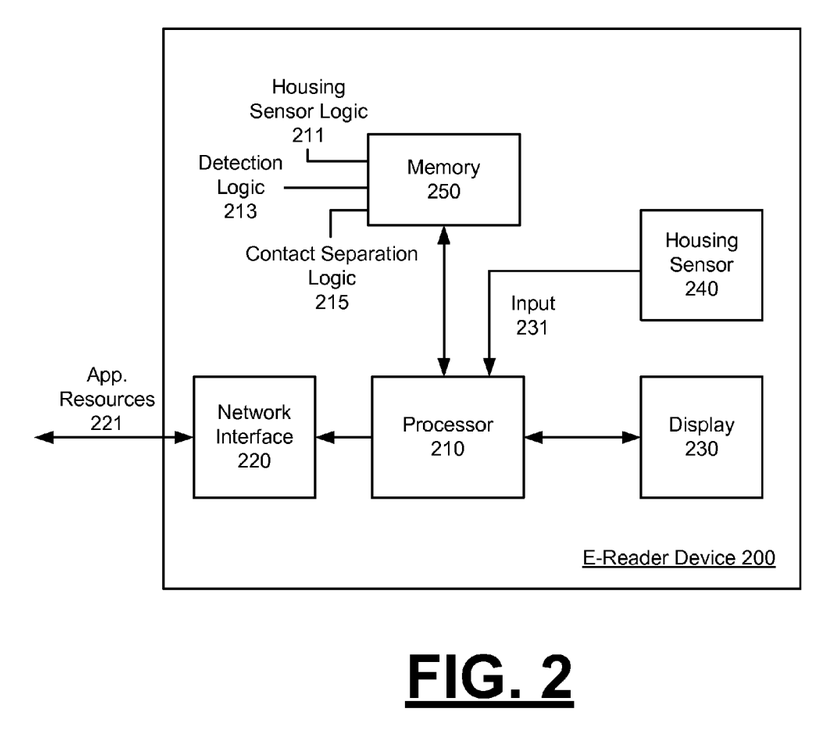
FIG. 2 illustrates an example of an e-reader device or other electronic personal display device, for use with one or more embodiments described herein.

FIG. 2 illustrates an example of an e-reader device 200 or other electronic personal display device, for use with one or more embodiments described herein. In an example of FIG. 2, an e-reader device 200 can correspond to, for example, the device 110 as described above with respect to FIG. 1. With reference to FIG. 2, e-reader device 200 includes a processor 210, a network interface 220, a display 230, one or more housing sensor components 240, and a memory 250.

The processor 210 can implement functionality using instructions stored in the memory 250. Additionally, in some implementations, the processor 210 utilizes the network interface 220 to communicate with the network service 120 (see FIG. 1). More specifically, the e-reader device 200 can access the network service 120 to receive various kinds of resources (e.g., digital content items such as e-books, configuration files, account information), as well as to provide information (e.g., user account information, service requests etc.). For example, e-reader device 200 can receive application resources 221, such as e-books or media files, that the user elects to purchase or otherwise download from the network service 120. The application resources 221 that are downloaded onto the e-reader device 200 can be stored in the memory 250.

In some implementations, the display 230 can correspond to, for example, a liquid crystal display (LCD) or light emitting diode (LED) display that illuminates in order to provide content generated from processor 210. In some implementations, the display 230 can be touch-sensitive. In some variations, the display 230 can correspond to an electronic paper type display, which mimics conventional paper in the manner in which content is displayed. Examples of such display technologies include electrophoretic displays, electrowetting displays, and electrofluidic displays.

The processor 210 can receive input from various sources, including the housing sensor components 240, the display 230, and/or other input mechanisms (e.g., buttons, keyboard, mouse, microphone, etc.). With reference to examples described herein, the processor 210 can respond to input 231 from the housing sensor components 240. In some embodiments, the processor 210 responds to inputs 231 from the housing sensor components 240 in order to facilitate or enhance e-book activities such as page turning and/or page transitions.

In some embodiments, the memory 250 may store housing sensor logic 211 that monitors for user interactions detected through the housing sensor components 240, and further processes the user interactions as a particular input or type of input. In an alternative embodiment, the housing sensor logic 211 may be integrated with the housing sensor components 240. For example, the housing sensor components 240 can be provided as a modular component that includes integrated circuits or other hardware logic, and such resources can provide some or all of the housing sensor logic (see also housing sensor logic 135 of FIG. 1). For example, integrated circuits of the housing sensor components 240 can monitor for contact separation (e.g., touch and release) and/or process the release of contact with a touch sensing region of the housing as being a particular type of input. In variations, some or all of the housing sensor logic 211 may be implemented with the processor 210 (which utilizes instructions stored in the memory 250), or with an alternative processing resource.

In one implementation, the housing sensor logic 211 includes detection logic 213 and contact separation logic 215. The detection logic 213 implements operations to monitor for user contact on a surface of the housing coinciding with placement of the sensor. The contact separation logic 215 detects and correlates a contact separation (e.g., finger liftoff) as a particular type of input or user action. For some embodiments, the contact separation logic 215 may correlate a contact separation from a first set of touch sensors (and/or first sensing region) with a first type of input, and may correlate a contact separation from a second set of touch sensors (and/or second sensing region) with a second type of input. For example, a finger liftoff with respect to a first set of touch sensors may be interpreted as a forward page transition, whereas a finger liftoff with respect to a second set of touch sensors may be interpreted as a backward page transition.

For some embodiments, the detection logic 213 may register a number of fingers that are initially in contact with a touch sensing region. For example, if a user places four fingers over a touch sensing region of the e-reader device 200, the detection logic 213 may determine an input capacitance associated with those four fingers. Accordingly, the contact separation logic 215 may detect a contact separation from the touch sensing region if any of the previously registered fingers are no longer in contact with the touch sensing region. For example, if the user lifts off any one of the four fingers from the touch sensing region of the e-reader device 200, the detection logic 213 may detect a new (e.g., lower) input capacitance associated with the remaining three fingers still in contact with the touch sensing region. The contact separation logic 215 may interpret the drop in capacitance as a contact-separation input.

E-Book Housing Configurations

Figure 3A:
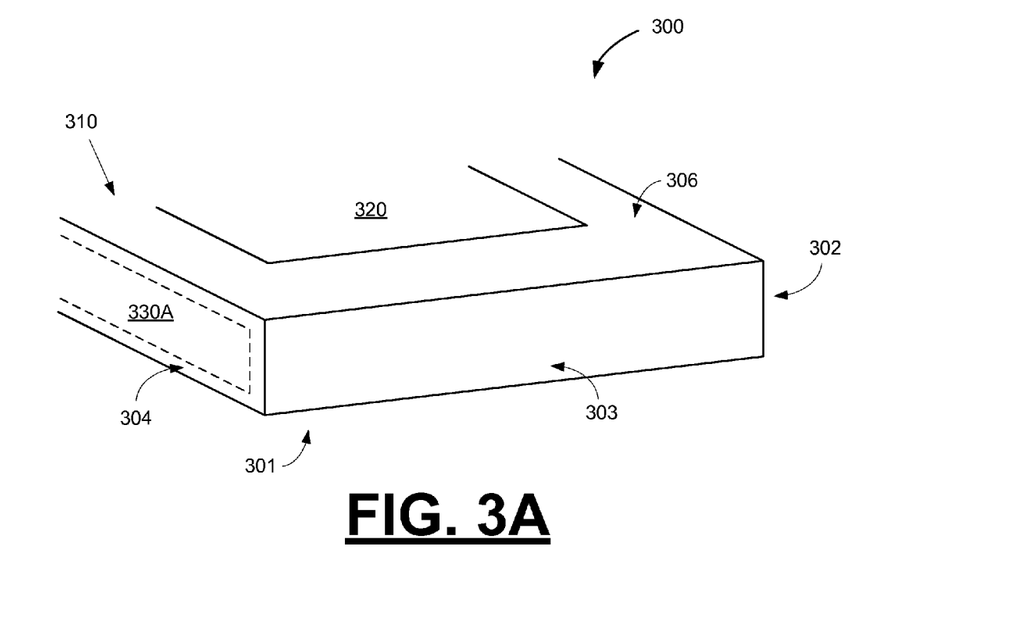
FIGS. 3A-3C illustrate an e-reader device capable of detecting contact-separation inputs, in accordance with some embodiments.
Figure 3B:
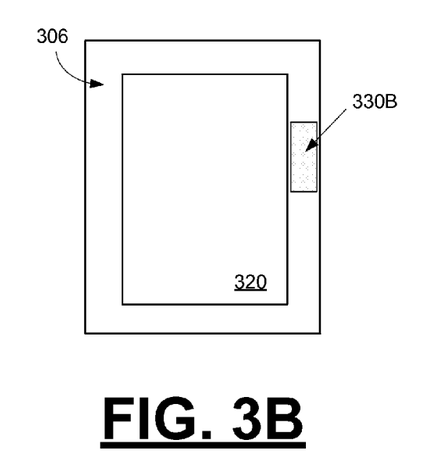
Figure 3C:
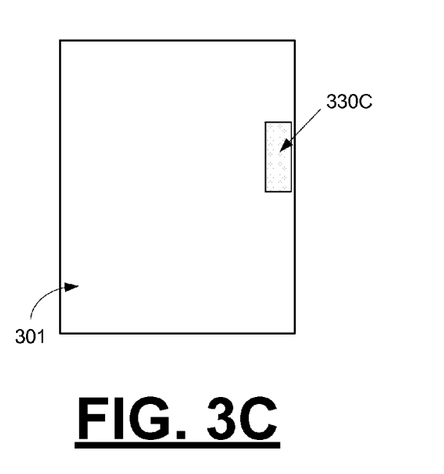

FIGS. 3A-3B illustrate an example of an e-reader device 300 capable of detecting contact-separation inputs, in accordance with some embodiments. The e-reader device 300 includes a housing 310 having a number of surfaces 301-307. More specifically, the housing 310 includes a back surface 301, sidewalls 302-304 (although not shown, the device 300 may further include a fourth sidewall opposite sidewall 303), and a front surface 306. The e-reader device 300 can be substantially tabular or rectangular, so as to have a front surface that is substantially occupied by a display screen 320 so as to enhance content viewing. More specifically, the front surface 306 may be in the shape of a bezel surrounding the display screen 320. The display screen 320 can be part of a display assembly, and can be touch sensitive. For example, the display screen 320 can be provided as a component of a modular display assembly that is touch-sensitive and integrated with housing 310 during a manufacturing and assembly process.

One or more touch sensing regions 330A-330C may be provided on various portions of the housing 310. Specifically, the touch sensing regions 330A-330C may coincide with the integration of touch-sensors with the housing 310. For some embodiments, each of the touch sensing regions 330A-330C may be provided in regions of the housing 310 that are accessible by the user (e.g., within reach of the user's finger) while holding the device 300 in one hand. For example, touch sensing region 330A may be provided on a sidewall (e.g., sidewall 304) of the housing 310 (e.g., as shown in FIG. 3A); touch sensing region 330B may be provided on the front surface 306 of the housing 310 (e.g., as shown in FIG. 3B); and touch sensing region 330C may be provided on the back surface 301 of the housing 310 (e.g., as shown in FIG. 3C). Specifically, the touch sensing region 330A may substantially encompass a surface of the sidewall 330A that a user contacts (e.g., with one or more fingers) in order to grip and/or hold the device 300. Similarly, the touch sensing region 330B may come into contact with a user's thumb, and the touch sensing region 330C may come into contact with a user's index finger, while gripping and/or holding the device 300.

According to embodiments, the e-reader device 300 can integrate one or more types of touch-sensitive technologies in order to provide touch-sensitivity on both the touch sensing regions 330A-330C and on the display screen 320. It should be appreciated that a variety of well-known touch sensing technologies may be utilized to provide touch-sensitivity at either the sensing regions 330A-330C and/or on the display screen 320. By way of example, touch sensors used with the touch sensing regions 330A-330C or display screen 320 can utilize resistive touch sensors; capacitive touch sensors (using self and/or mutual capacitance); inductive touch sensors; and/or infrared touch sensors. For example, sensing regions 330A-330C can be employed using resistive sensors, which can respond to pressure applied to the surface of the housing 310 in areas coinciding with respective touch sensing regions 330A-330C. In a variation, the touch sensing regions 330A-330C can be implemented using a grid pattern of electrical elements which can detect capacitance inherent in human skin. Alternatively, the touch sensing regions 330A-330C can be implemented using a grid pattern of electrical elements which are placed on or just beneath the surface of the housing 310, and which deform sufficiently on contact to detect touch from an object such as a finger. More generally, touch-sensing technologies for implementing the touch sensing regions 330A-330C (and/or display screen 320) can employ resistive touch sensors, capacitive touch sensors (using self and/or mutual capacitance), inductive touch sensors, and/or infrared sensors.

Additionally, the touch sensing regions 330A-330C (as well as the display screen 320) can be equipped to detect multiple simultaneous touches. For example, with reference to an example of FIG. 3A, a processor of the e-reader device 300 can process input from the touch sensing region 330A in order to be responsive to (or distinctly detect) a user simultaneously lifting off multiple fingers (e.g., index finger and middle finger) from the sidewall 304 of the housing 310. The concurrent release of multiple fingers may be detected by a change in capacitance of one or more touch sensors of the touch sensing region 330A. For example, lifting off multiple fingers may cause a greater change in the detected capacitance than lifting off a single finger. The user may lift multiple fingers off the sidewall 304 of the e-reader device 300, concurrently, as a form of input. For example, the concurrent release can be interpreted as a specific type of input (e.g., multiple-contact separation) or as a general input (e.g., contact separation).

It should be noted that some embodiments may include more or fewer touch sensing regions than those shown with respect to FIGS. 3A-3C. For example, in some embodiments, the e-reader device 300 may include only one of the touch sensing regions 330A, 330B, or 330C. In other embodiments, the e-reader device 300 may include two or more of the touch sensing regions 330A-330C. While the examples of FIGS. 3A-3C illustrate three discrete touch-sensing regions 330A-330C on the surface of the housing 310, variations can provide for other surfaces of the housing 310 to be integrated with touch sensors in order to enable touch-sensitivity at any location of, for example, the front, back, and/or sides of the device 300.

Figure 4A:
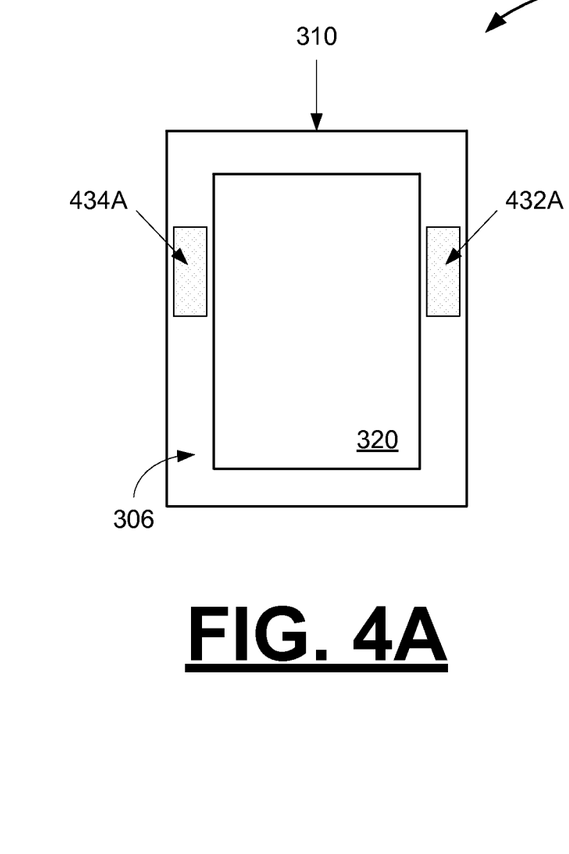
FIGS. 4A-4B illustrate an e-reader device capable of detecting contact-separation inputs, in accordance with other embodiments.
Figure 4B:
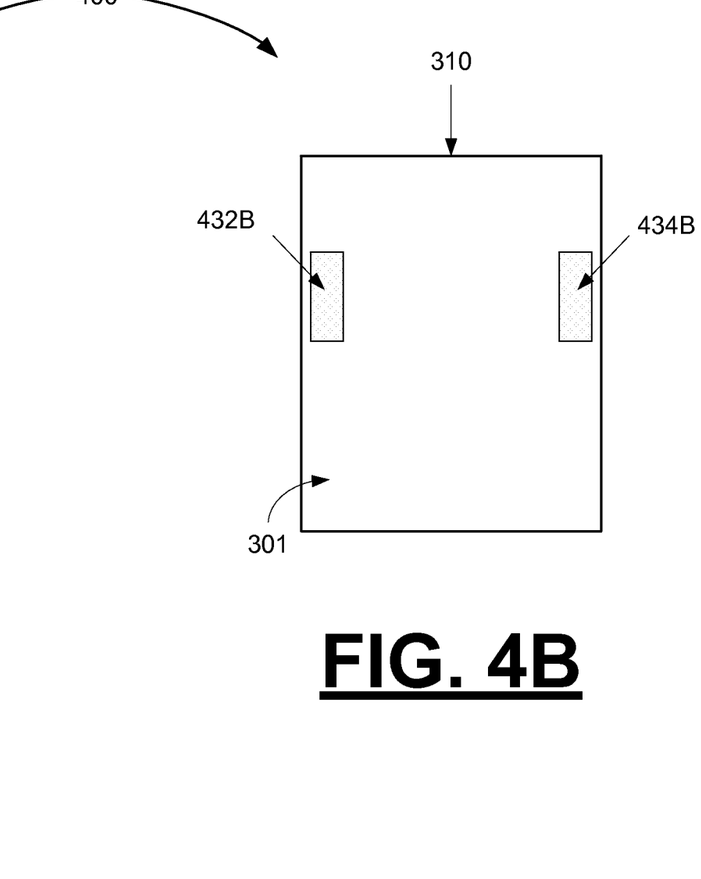

FIGS. 4A-4B illustrate an e-reader device 400 capable of detecting contact-separation inputs, in accordance with other embodiments. Specifically, the e-reader device 400 may include one or more pairs of touch sensing regions 432A-434A and/or 432B-434B. As described above, the touch sensing regions 432A-434A and 432B-434B may coincide with the integration of touch sensors with the housing 310. It should be appreciated that a variety of well-known touch sensing technologies may be utilized to provide touch-sensitivity at any of the sensing regions 432A, 434A, 432B, and/or 434B (e.g., as describe above with respect to FIGS. 3A-3C). For some embodiments, each pair of teach sensing regions 432A-434B and 432B-434B may be provided in regions of the housing 310 that are accessible by the user (e.g., within reach of the user's fingers) while holding the device 400 in two hands.

With reference to FIG. 4A, the pair of touch sensing regions 432A-434A are provided on the front surface 306 of the housing 310. For some embodiments, the touch sensing regions 432A-434A may be activated by a user's thumbs when operating the device 400 with two hands. For example, while gripping the device 400 with both hands, touch sensing region 434A may be in contact with a user's left thumb and touch sensing region 432A may be in contact with the user's right thumb. Each of the touch sensing regions 432A and 434A may be responsive to contact-separation inputs by the user. More specifically, a processor of the e-reader device 400 may interpret contact separation from each of the touch sensing regions 432A and 434A as a particular (e.g., different) type of input. For example, releasing contact with touch sensing region 434A (e.g., by lifting the user's left thumb) may trigger a first type of input (e.g., backward page transition), while releasing contact with touch sensing region 432A (e.g., by lifting the user's right thumb) may trigger a second type of input (e.g., forward page transition). For other embodiments, the processor of the e-reader device 400 may interpret contact separation from each of the touch sensing regions 432A and 434A as redundant (e.g., the same type of) inputs.

With reference to FIG. 4B, the pair of touch sensing regions 432B-434B are provided on the back surface 301 of the housing 310. For some embodiments, the touch sensing regions 432B-434B may be activated by a user's index fingers (and/or other fingers) when operating the device 400 with two hands. For example, while gripping the device 400 with both hands, touch sensing region 434B may be in contact with a user's left index finger and touch sensing region 432B may be in contact with the user's right index finger. Each of the touch sensing regions 432B and 434B may be response to contact-separation inputs by the user. As described above, a processor of the e-reader device 400 may interpret contact separation from each of the touch sensing regions 432B and 434B as a particular type of input. For example, releasing contact with touch sensing region 434B (e.g., by lifting the user's left index finger) may trigger a first type of input (e.g. backward page transition), while releasing contact with touch sensing region 432B (e.g., by lifting the user's right index finger) may trigger a second type of input (e.g., forward page transition). For other embodiments, the processor of the e-reader device 400 may interpret contact separation from each of the touch sensing regions 432B and 434B as redundant inputs.

For some embodiments, the touch sensing regions 432A, 434A, 432B, and 434B can be equipped to detect multiple simultaneous touches. For example, with reference to an example of FIG. 4A, a processor of the e-reader device 400 can process input from the touch sensing regions 432A and 434A in order to be responsive to (or distinctly detect) a user simultaneously releasing both the of the touch sensing regions 432A and 434A (e.g., by lifting both of the user's thumbs, concurrently). The user may lift both thumbs off the touch sensing regions 432A and 434A, concurrently, as a form of input. For example, the concurrent release can be interpreted as a specific type of input (e.g., multiple-contact separation) or as a general input (e.g., contact separation).

It should be noted that some embodiments may include more or fewer touch sensing regions than those shown with respect to FIGS. 4A-4B. For example, in some embodiments, the e-reader device 400 may include only one pair of touch sensing regions 432A-434A or 432B-434B. In other embodiments, the e-reader device 400 may include both pairs of touch sensing regions 432A-434A and 432B-434B. While the example of FIGS. 4A-4B illustrate two distinct pairs of touch sensing regions 432A-434A and 432B-434B on the surface of the housing 310, variations can provide for other surface of the housing 310 to be integrated with touch sensors in order to enable touch-sensitivity at any location of, for example, the front, back, and/or sides of the device 400.

Page Transition Functionality

Figure 5:
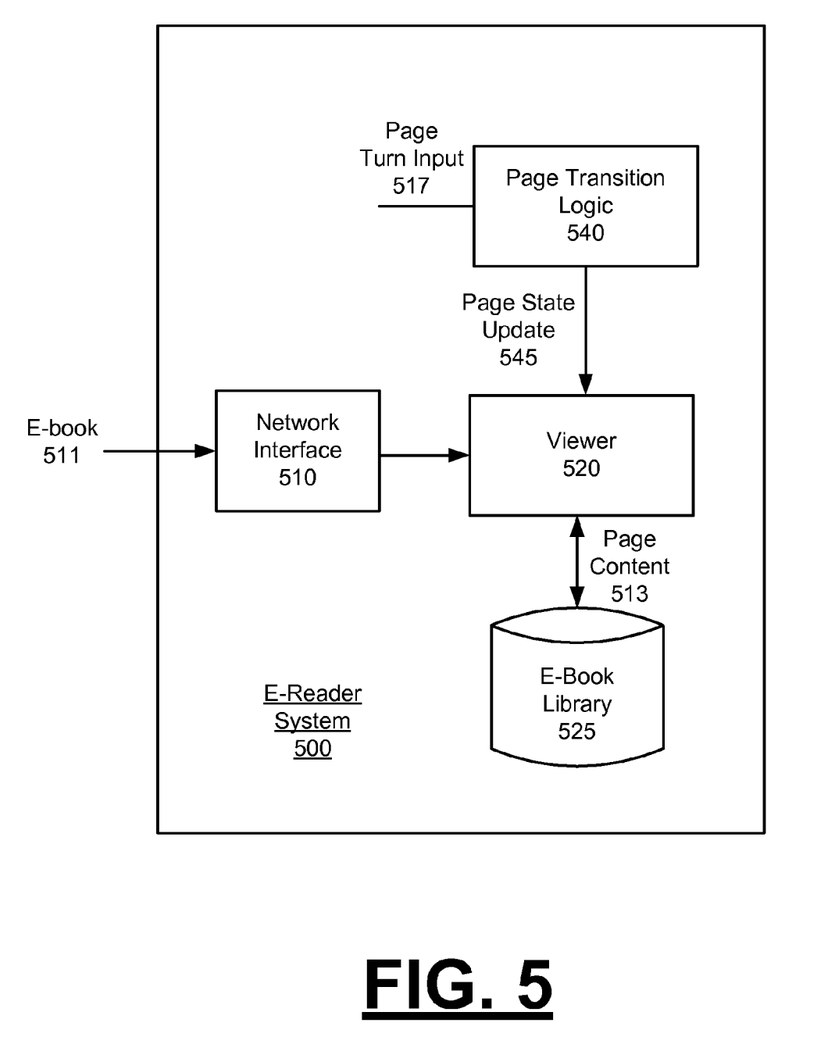
FIG. 5 illustrates an e-reader system for displaying paginated content, according to one or more embodiments.

FIG. 5 illustrates an e-reader system 500 for displaying paginated content, according to one or more embodiments. An e-reader system 500 can be implemented as, for example, an application or device, using components that execute on, for example, an e-reader device such as shown with examples of FIGS. 1, 2, 3A-3C, and 4A-4B. Furthermore, an e-reader system 500 such as described can be implemented in a context such as shown by FIG. 1, and configured as described by an example of FIG. 2, FIGS. 3A-3C, and/or FIGS. 4A-4B.

In an example of FIG. 5, a system 500 includes a network interface 510, a viewer 520 and page transition logic 540. As described with an example of FIG. 1, the network interface 510 can correspond to a programmatic component that communicates with a network service in order to receive data and programmatic resources. For example, the network interface 510 can receive an e-book 511 from the network service that the user purchases and/or downloads. E-books 511 can be stored as part of an e-book library 525 with memory resources of an e-reader device (e.g., see memory 250 of e-reader device 200).

The viewer 520 can access page content 513 from a selected e-book, provided with the e-book library 525. The page content 513 can correspond to one or more pages that comprise the selected e-book. The viewer 520 renders one or more pages on a display screen at a given instance, corresponding to the retrieved page content 513. The page state can correspond to a particular page, or set of pages that are displayed at a given moment.

The page transition logic 540 can be provided as a feature or functionality of the viewer 520. Alternatively, the page transition logic 540 can be provided as a plug-in or as an independent functionality from the viewer 520. The page transition logic 540 can signal page state updates 545 to the viewer 520. The page state update 545 can specify a page transition, causing the viewer 520 to render a new page. In specifying the page state update 545, the page transition logic 540 can provide for single page turns, multiple page turns or chapter turns. The page state update 545 for a single page turn causes the viewer 520 to transition page state by presenting page content 513 that is next in sequence (forward or backward) to the page content that is being displayed. The page state update 545 for a multi-page turn causes the viewer 520 to transition page state by presenting page content 513 that is a jump forward or backward in sequence from the page state under display. Likewise, the page state update 545 for a chapter turn causes the viewer 520 to transition page state by presenting page content 513 that is a next chapter in sequence (forward or backward) to a chapter of a current page state. Accordingly, the page state update 545 can signify a transition value representing the page state that is to be displayed next (e.g., one page transition or ten page transition) or a transition type (e.g., page versus chapter transition).

According to some embodiments, the page transition logic 540 can be responsive to different kinds of input, including an input action which signifies page turns (or page transitions) 517. The page turn input 517 can include, for example, single page turns, mufti-page turns and/or chapter turns. The type of page turn input 517 can be determined from the type of input provided. For example, the page turn input 517 can be provided by the user interacting with one or more touch sensing regions of the e-reader device, wherein contact separation (e.g., finger liftoff) from the touch sensing regions can be interpreted as single page turns. For some embodiments, the duration of the separation (e.g., how long the user holds a finger off or away from a touch sensing region) can be interpreted as a multi-page turn or chapter input. Still further, action such as a concurrent release (e.g., multi-finger liftoff) from multiple touch sensing regions can be interpreted as a chapter transition.

In response to receiving a page turn input 517, the page transition logic 540 signals the page state update 545 to the viewer 520. The viewer 520 then updates the page content 513 to reflect the change represented by the page state update 545 (e.g., single page transition, multi-page transition, or chapter transition).

Methodology

Figure 6:
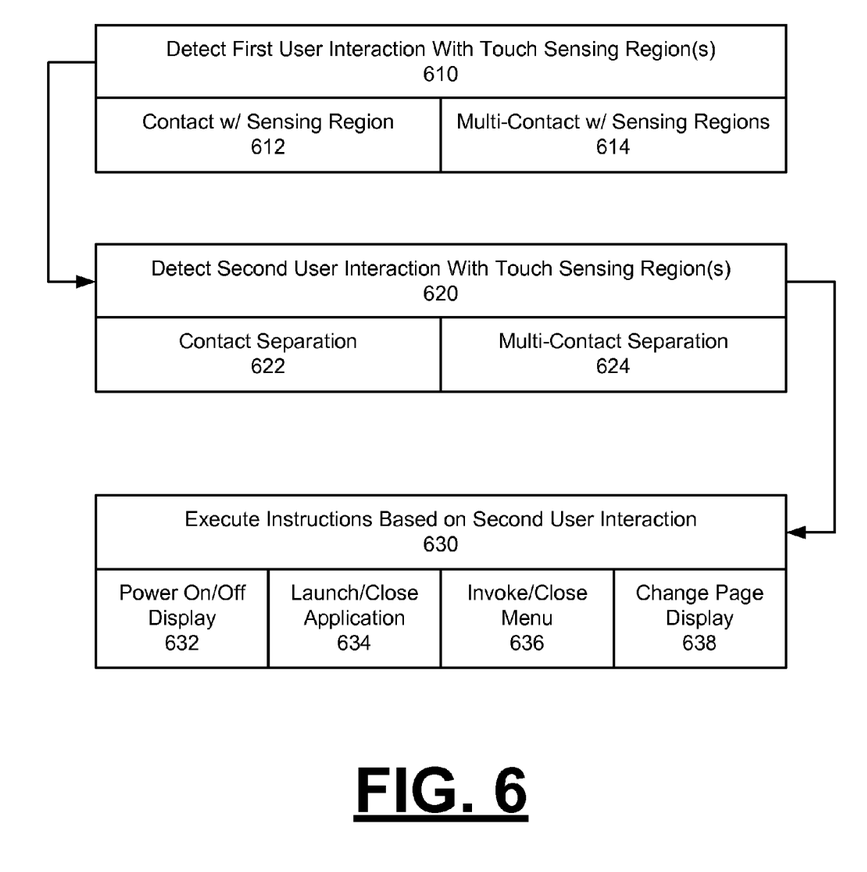
FIG. 6 illustrates a method of operating an e-reader device based on contact-separation inputs, according to one or more embodiments.

FIG. 6 illustrates a method of operating an e-reader device based on contact-separation inputs, according to one or more embodiments. In describing an example of FIG. 6, reference may be made to components such as described with FIGS. 2-4 for purposes of illustrating suitable components for performing a step or sub-step being described.

With reference to an example of FIG. 2, the e-reader device 200 may detect a first user interaction with one or more touch sensing regions on a device housing (610). The first user interaction may correspond with a user contact (e.g., touch) with the one or more touch sensing regions. For example, the processor 210 can receive inputs 231 from the housing sensor components 240. The placement of the sensor components 240 may be configured for one-handed operation (e.g., as described above with respect to FIGS. 3A-3C) or for two-handed operation (e.g., as described above with respect to FIGS. 4A-4B). More specifically, the placement of the sensor components 240 may coincide with one or more touch sensing regions on the surface of the device housing.

For some embodiments, the processor 210, in executing the detection logic 213, may monitor for user contact with a touch sensing region of the housing (612). For example, with reference to FIG. 3A, the detection logic 213 may register a user contacting (e.g., placing a finger on) the touch sensing region 330A of the housing 310. For other embodiments, the processor 210, in executing the detection logic 213, may monitor for user contact with multiple touch sensing regions (614). For example, with reference to FIG. 4A, the detection logic 213 may register user contact with both touch sensing regions 432A and 434A, concurrently.

The e-reader device 200 may subsequently detect a second user interaction with the one or more touch sensing regions on the device housing (620). The second user interaction may correspond with a contact separation (e.g., release) from the one or more touch sensing regions. For example, the processor 210 may execute the contact separation logic 215 to process additional input 231 received via the housing sensor components 240. The contact separation logic 215 may detect a contact separation from the one or more touch sensing regions if any of the previously registered fingers are no longer in contact with the corresponding touch sensing regions. More specifically, the contact separation logic 215 may detect a contact separation if the number of fingers making contact with the one or more touch sensing regions (e.g., as detected by the detection logic 213) is less than the number of fingers registered with those same regions.

For some embodiments, the processor 210, in executing the contact separation logic 215, may detect a contact separation from a touch sensing region of the housing (622). For example, with reference to FIG. 3A, the detection logic 213 may detect a user releasing contact with (e.g., lifting user's finger from) the touch sensing region 330A of the housing 310. For other embodiments, the processor 210, in executing the contact separation logic 215, may detect a multi-contact separation from one or more touch sensing regions (624). For example, with reference to FIG. 4A, the detection logic 213 may detect a user releasing contact with the touch sensing region 432A (e.g., by lifting the user's right thumb) and/or releasing contact with the touch sensing region 434A (e.g., by lifting the user's left thumb). Still further, the detection logic 213 may detect the user releasing contact with both touch sensing regions 432A and 434A, concurrently.

The e-reader 200 may then execute a set of instructions based on the second user interaction (630). For example, the processor 210 may carry out one or more operations on the device 200 upon detecting a contact separation with one or more touch sensing regions of the housing. Various operations may be carried out in response to the user lifting off one or more fingers from the housing. For some embodiments, the processor 210 may power on or power off the display screen (632). For other embodiments, the processor 210 may launch or close a particular application (634). Still further, for some embodiments, the processor 210 may invoke or close a system menu or sub-menu (636).

In yet another embodiment, the processor 210 may change the e-book page presented on the display screen to a new page, for example, based on a magnitude and/or type of the user input (638). For example, with reference to FIG. 3A, the processor 210 may interpret the duration of contact separation from the touch sensing region 330A as a magnitude or degree associated with a corresponding page transition. Further, with reference to FIG. 4A, a contact separation from the touch sensing region 434A may be interpreted as a backward page transition, while a contact separation from the touch sensing region 432A may be interpreted as a forward page transition.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A computing device comprising:
 a display assembly including a screen;
 a housing that at least partially circumvents the screen so that the screen is viewable;
 a first touch sensor provided with a first portion of the housing; and
 a processor provided within the housing, the processor operating to:
  detect a first user interaction with the first touch sensor, wherein the first user interaction corresponds with a user making contact with the first touch sensor; and
  detect a second user interaction with the first touch sensor, wherein the second user interaction corresponds with the user releasing contact for a predefined duration of separation with the first touch sensor; and
  execute a first set of instructions in response to detecting the second user interaction.

2. The computing device of claim 1, wherein the first set of instructions include instructions for changing a state of the screen of the display assembly.

3. The computing device of claim 1, wherein the first set of instructions include instructions for powering on or powering off the display assembly.

4. The computing device of claim 1, wherein the first set of instructions include instructions for launching or closing an application.

5. The computing device of claim 1, wherein the first set of instructions include instructions for invoking or closing a system menu.

6. The computing device of claim 1, wherein the first set of instructions include instructions for performing a page transition operation.

7. The computing device of claim 1, wherein the first touch sensor is provided on a sidewall of the housing.

8. The computing device of claim 1, wherein the first touch sensor is provided on a back surface of the housing.

9. The computing device of claim 1, wherein the first touch sensor is provided on a front surface of the housing.

10. The computing device of claim 1, further comprising:
 a second touch sensor provided with a second portion of the housing.

11. The computing device of claim 10, wherein the processor is to further:
 detect a third user interaction with the second touch sensor, wherein the third user interaction corresponds with the user making contact with the second touch sensor; and
 detect a fourth user interaction with the second touch sensor, wherein the fourth user interaction corresponds with the user releasing contact with the second touch sensor.

12. The computing device of claim 11, wherein the processor is to further:

execute a second set of instructions in response to detecting the fourth user interaction.

13. The computing device of claim 12, wherein the first set of instructions include instructions for performing a forward page transition, and wherein the second set of instructions include instructions for performing a backward page transition.

14. A method for operating a computing device, the method being implemented by one or more processors and comprising:
   detecting a first user interaction with a first touch sensor provided with a housing of the computing device, wherein the first user interaction corresponds with a user making contact with the first touch sensor; and
   detecting a second user interaction with the first touch sensor, wherein the second user interaction corresponds with the user releasing contact for a predefined duration of separation with the first touch sensor; and
   executing a first set of instructions in response to detecting the second user interaction.

15. The method of claim 14, wherein the first set of instructions include instructions for changing a state of the screen of the display assembly.

16. The method of claim 15, further comprising:
   executing a second set of instructions in response to detecting the fourth user interaction.

17. The method of claim 14, wherein the first set of instructions include instructions for performing a page transition operation.

18. The method of claim 17, wherein the first set of instructions include instructions for performing a forward page transition, and wherein the second set of instructions include instructions for performing a backward page transition.

19. The method of claim 14, further comprising:
   detecting a third user interaction with a second touch sensor provided with the housing of the computing device, wherein the third user interaction corresponds with the user making contact with the second touch sensor; and
   detecting a fourth user interaction with the second touch sensor, wherein the fourth user interaction corresponds with the user releasing contact with the second touch sensor.

20. A non-transitory computer-readable medium that stores instructions, that when executed by one or more processors, cause the one or more processors to perform operations that include:
   detecting a first user interaction with a first touch sensor provided with a housing of a computing device, wherein the first user interaction corresponds with a user making contact with the first touch sensor; and
   detecting a second user interaction with the first touch sensor, wherein the second user interaction corresponds with the user releasing contact for a predefined duration of separation with the first touch sensor; and
   executing a first set of instructions in response to detecting the second user interaction.

* * * * *